April 1, 1969  E. WEICHEL  3,435,900
SELF-LOADING WAGON TO HARVEST SUGAR BEETS
Filed Oct. 22, 1965

INVENTOR

ERNST WEICHEL

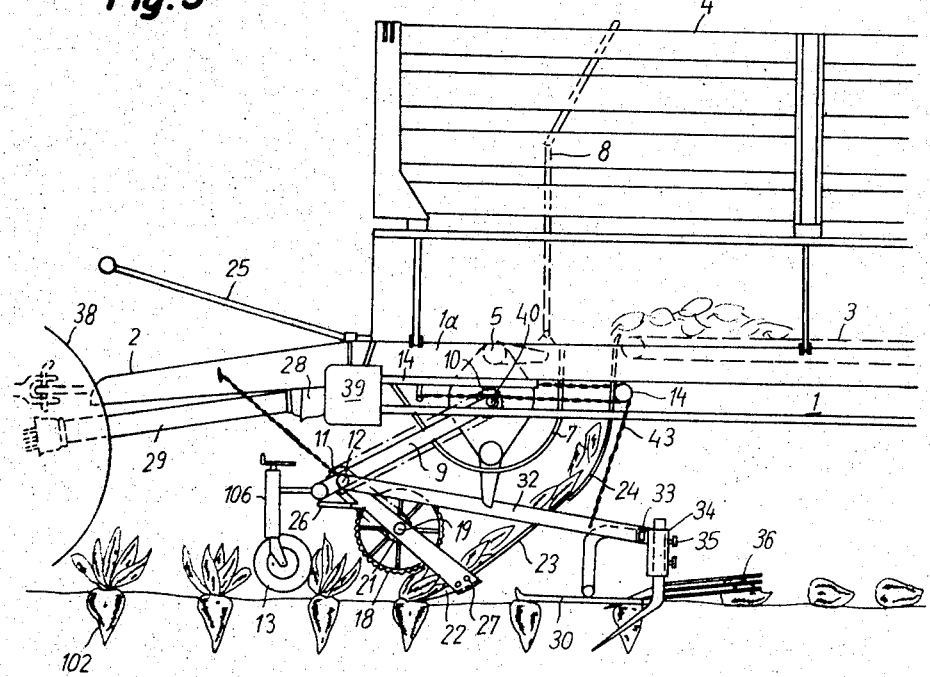
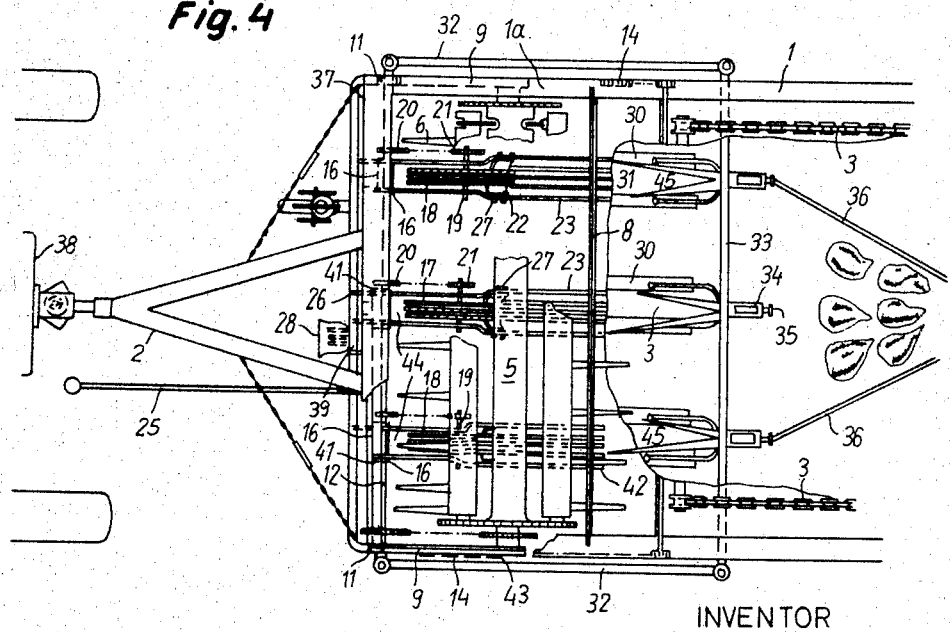

April 1, 1969     E. WEICHEL     3,435,900
SELF-LOADING WAGON TO HARVEST SUGAR BEETS
Filed Oct. 22, 1965     Sheet 3 of 5
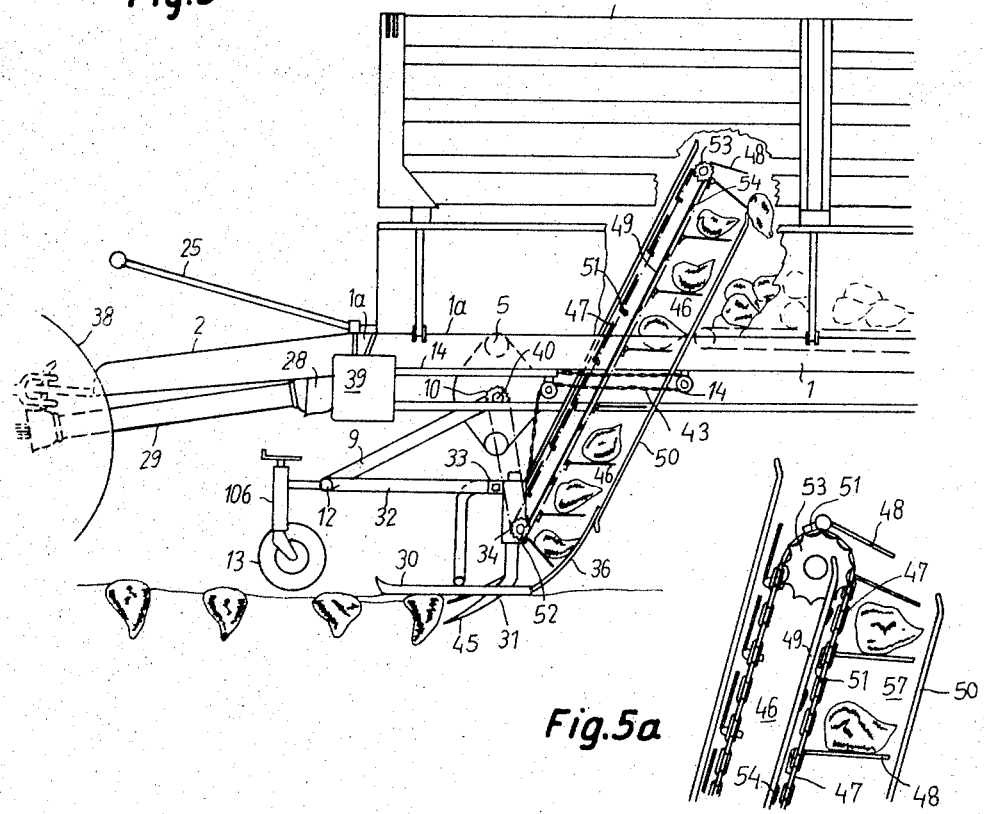
Fig.5
Fig.5a
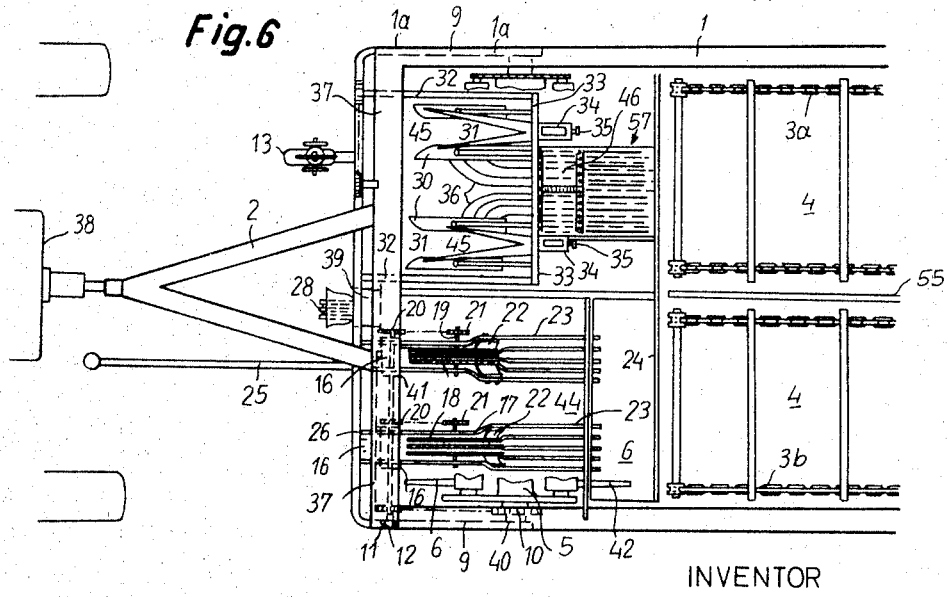
Fig.6
INVENTOR
ERNST WEICHEL

United States Patent Office 3,435,900
Patented Apr. 1, 1969

3,435,900
SELF-LOADING WAGON TO HARVEST
SUGAR BEETS
Ernst Weichel, 1 Bohnhofstrasse, 7326 Heiningen,
Kreis Goppingen, Germany
Filed Oct. 22, 1965, Ser. No. 504,293
Claims priority, application Germany, Oct. 24, 1964,
W 37,837
Int. Cl. A01d 27/02, 87/04; B60p 1/38
U.S. Cl. 171—101          6 Claims

ABSTRACT OF THE DISCLOSURE

A harvesting device for root crops planted in parallel rows is formed of a self-loading truck containing a loading chamber divided into two compartments. Means are provided on the undercarriage of the truck for severing the head portions from the root portions of the crop and for uprooting the root portions. Conveyors pass the head portions into one of the compartments and the root portions into the other compartment. The severing means and the uprooting means are adjustably positioned on the undercarriage for establishing their height above ground level, and the uprooting means is arranged to operate sequentially after the severing means.

---

The present invention relates in general to harvesting apparatus and in particular to a new and useful implement for the mechanized harvesting of root crops, preferably sugar beets, with means for separately loading both leaves and roots.

Until now, sugar beets have been harvested with the use of numerous and different types of manual implements, animal-drawn implements, or motor-drawn or -driven implements, semi-automatically as well as fully automatically, predominantly so that in several independent operations first the leaves were severed from the beets, then piled up in heaps or swaths and subsequently loaded and driven away. When the field or single strips of the field were cleared of the leafage, the beets were usually dug with other implements, put on swaths or heaps, loaded and driven away.

It is obvious that the task of harvesting a sugar beet stand, that is, two separate parts of a delicate crop having entirely different physical constitution and of relatively great weight and volume, by means of a plurality of different single operations (beheading-mowing, loading, driving away, digging, driving away the swaths, intermediate storage, loading, transporting, unloading) under often unfavorable weather conditions, constitutes a difficult and laborious job. Until the present invention this task required the hiring of additional seasonal help and could not be accomplished by a single person.

The present invention is an improvement over prior art devices in the provision of a single implement which can be operated by one man, which permits operation with low prime costs and readying times and at high output, and is suitable both for loss-free and clean harvesting of the leaves and beets directly from the field, as well as for the loading, transportation, and discharging of the harvested material in the yard.

The above task is accomplished according to the invention in that simple harvesting implements are provided for cutting and loading the leaves, and also the digging and loading of the beets without requiring the cutting and stacking of leaves and the piling of the beets and the subsequent collection thereof.

In accordance with one embodiment of the invention there is provided a loading truck having a transmission and drive means which is adapted to be connected to a tractor. The truck includes means for mounting a plurality of cutting knives to depend in an adjustable manner in the forward portion of the truck so that they may be oriented with a load of beets or similar products to be harvested. The apparatus advantageously includes for each row a disk which is adapted to be moved over the tops of the root vegetables in order to align the cutting knives in a position to cleanly sever the heads with the leaves from each root. The mechanism also advantageously includes means for directing the severed leaves upwardly into conveyor means which moves the leaves automatically onto the back portion of the truck.

The inventive arrangement advantageously includes either a separate attachment for uprooting the root portion of the vegetable after the tops have been severed and for directing them into a separate loading compartment on the loading truck, or the arrangement may be such that the uprooting device operates at the same time as the cutting device but in another row, which row has already been passed over by the cutting device, so that the heads are already severed.

The inventive concept further includes a modification in which the roots are dug up and directed into separate piles for later collection by a loading device or by manual pick-up.

In a still further modification of the invention there is provided a unitized tractor and loading truck in which all of the operations, including the cutting and conveying of the leaves and the separate digging and loading of the roots, are accomplished at the same time.

Accordingly, it is an object of the invention to provide a harvesting device for root vegetables and the like which includes separate means for cutting the head portions from the vegetables and for loading them into a loading truck, and additional means for uprooting the root portion and for either directing them into separate piles on the ground or into a separate loading chamber on the loading truck.

A further object of the invention is to provide either an automotive device having drive means for conveying head portions of root vegetables into a loading chamber or a separate loading truck which may be driven by a separately attached device such as a tractor.

A further object of the invention is to provide a harvester particularly for root vegetables which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 3 is a view similar to FIG. 1 with additionally applied device for the digging of the sugar beets after the beheading;

FIG. 4 is a top plan view of the arrangement of FIG. 3;

FIG. 5 is a view similar to FIG. 3 of a somewhat modified embodiment of construction of an attached self-loading truck which differs from that shown in FIGS. 3 and 4 essentially in that the harvesting organs for the leaves and beets are arranged side by side, and that the loading surface is subdivided in longitudinal direction, so that the leaves as well as the beets can be placed on the loading surface simultaneously and separately;

Figure 7:
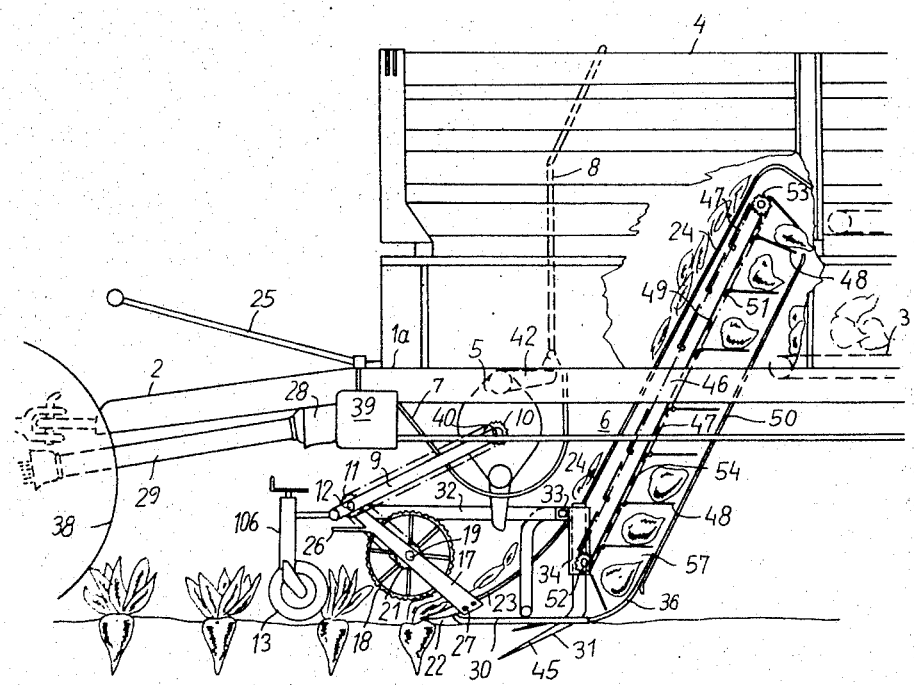
Figure 8:
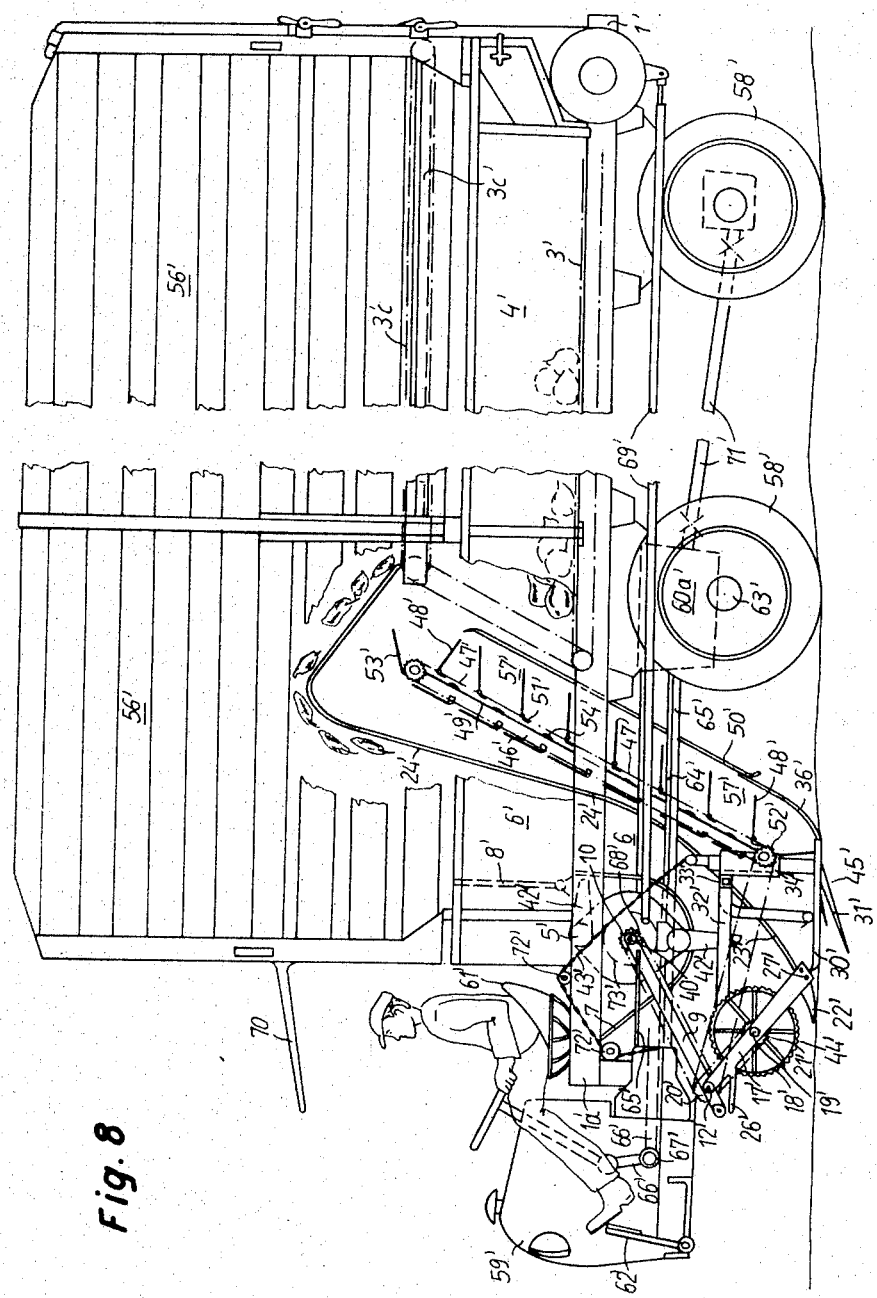

FIG. 5a is a partial elevational view of an elevator from FIG. 5;

FIG. 6 is a top plan view of the arrangement of FIG. 5;

FIG. 7 shows the side elevational view of another embodiment of beet beheading and harvesting device for the simultaneous harvesting and loading of leaf and beets in stacked loading boxes; and FIG. 8 is a side elevational view of another embodiment of the invention.

Figure 1:
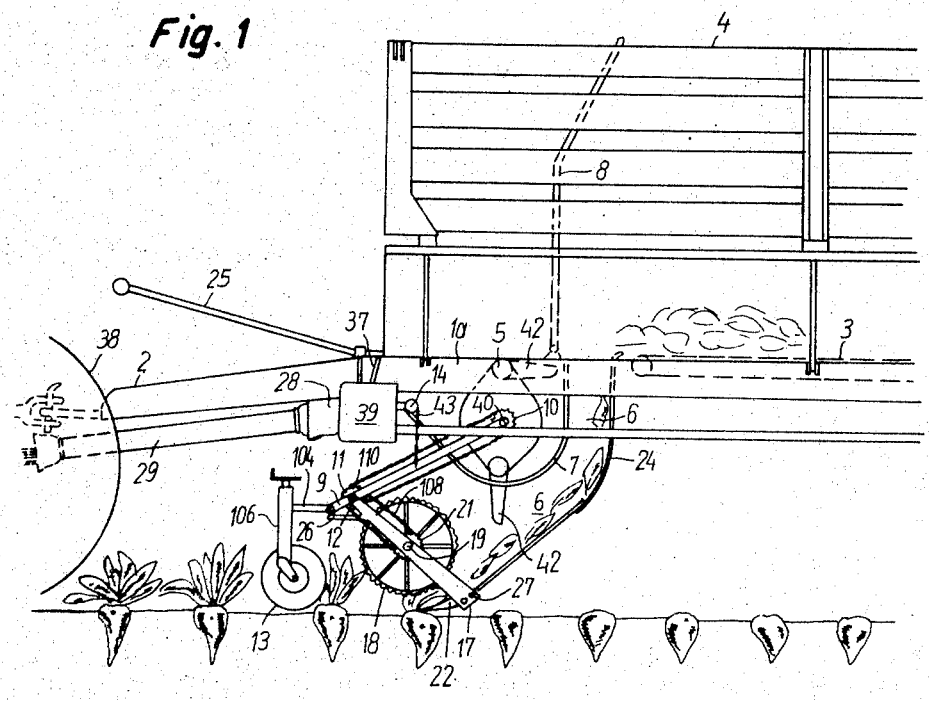
FIG. 1 is a partial side elevational view of an attached self-loading truck with a harvesting and take-up implement for beet leaves for the simultaneous beheading, loading, and transporting of three rows of beet leaf and constructed in accordance with the invention.
Figure 2:
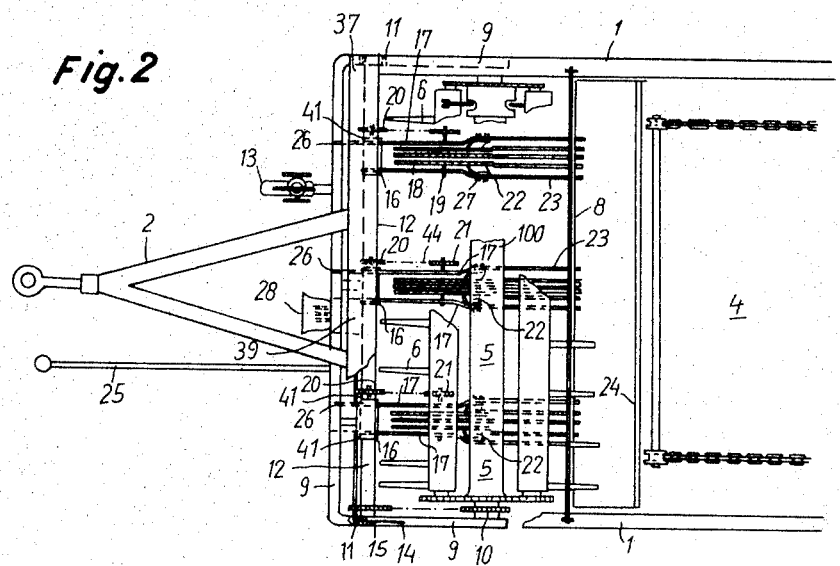
FIG. 2 is a top plan view of the truck shown in FIG. 1, with certain details of the self-loading truck omitted for clarity.

Referring to the drawings in particular, the invention embodied therein in FIGS. 1 and 2 shows the front part of an attachable self-loading truck which has a frame 1 with a frame extension 1a, a loading space 4, a scraping floor 3, and a conveyor 5 with conveying channel 6 arranged before the loading surface. Frame 9 is fastened to the frame extension 1a for easy removal, for example by means of suitable rapid closures. On a cross beam 37, which connects the extensions 1a of frame 1, there is provided a connecting bar 2 for hitching the self-loading truck to a tractor 38 and preferably also a transmission 39 and drive parts 28 for the mechanical drive of the conveying and harvesting device.

According to the invention, there is installed before the conveyor 5, instead of a take-up drum 100 and a frame 9, preferably pivotable and vertically adjustable about the point of suspension 40 of the conveyor drum. A rotating intermediate shaft 12 is mounted on the opposite end of frame 9. This intermediate shaft 12 receives its drive through a chain wheel pair 10, 11 from the conveyor 5, preferably with the same direction of rotation as the latter. At the pivot frame 9 are located bearing blocks 16, whose number equals the number of leaf rows to be beheaded. The intermediate shaft 12 is either additionally supported in these bearing blocks 16 or passed freely therethrough, so that the bore of these bearing blocks 16 surrounds the intermediate shaft 12 approximately concentrically. The bearing blocks 16 have two hollow pins 41, each of which has arranged on it for pivotal movement about an axis extending crosswise to the direction of travel a rocker arm 17. Both the rocker arm 17 and pins 41 together receive an axle 19 of tracing disks 18 (arranged) at a certain distance from the intermediate shaft 12.

The axle 19 is connected at its one end with a chain wheel 21 which is in drive connection with another chain wheel 20 on the intermediate shaft 12. Due to this arrangement, the tracing disk 18 is adjustable in height for each individual row independently of the adjacent rows and without impairment of its drive. All disks 18 are driven by the intermediate shaft 12 at the same speed.

In a working position the disks 18 take support on the leaves of the row of beets, so that they bring a beheading knife 22, secured at the lower end of the rocker arms 17 and adjustable in its spacing from the axle of the tracing disks, into the correct cutting height relative to a beet head 102, in known manner. Following the knife 22, a sliding grate 23, preferably consisting of individual rods or of a sliding sheet, is arranged, on which the cut-off bundle of leaves is pushed by the following leaves into the area of tines 42 of the conveyor 5. The conveyor 5 pushes the material, as known, in the conveying channel 6 onto the loading surface or respectively onto the rolling and scraping floor. As this does not involve any contact of the leaf with the ground, an absolutely clean and rapid collection of the leaves is possible.

By using the lift chain 43 (FIGS. 3 and 4), the pivot frame 9 can be adjusted to any height and can be raised, preferably using a mechanical hoisting device (not shown), but which comprises, for example, a motor-driven threaded spindle 14. The motor therefore is actuated from the tractor seat through the operating lever 25 which is moved into a travel position, so that the tracer disks 18 together with the knives 22 and the sliding grate 23 cannot touch the ground during transporting travel. The swivel connection of the shaft 12 at the hollow pins 41 is then, according to the invention, automatically blocked by abutments 26 during lifting of the pivot frame 9. In an operative position the pivot frame 9 can either be maintained above the soil by the lift chain 43 at any level or it can be guided by an additional, vertically displaceable supporting wheel 13 which may be adjustably positioned at a selected distance from the ground by adjustment of a support 104 therefor in a post 106 (FIG. 1). This vertical adjustment constitutes the rough adjustment of the entire implement, while the fine adjustment is effected separately for each row by the tracer disks 18. The sliding grate 23 extends a little beyond the lower edge of the channel bottom 24, so that it can follow the vertical movements of the tracer 18 or respectively of the knife 22, which is fine-adjusted by means of setting screws 27.

*Operation*

In service, the machine is driven from a tractor (not shown) through a cardan shaft 29. The tractor wheels are directed to run in the spaces between the beet rows. Power from the shaft 29 is directed into a transmission 39. The tracers 18 may be connected by chain 108 for driving by a sprocket 110 on shaft 12 or may be permitted to turn freely by removing the chain 108. Also other known models of such devices may be used.

After completion of the loading of a truckload, the harvesting device 5, 44, 45 is disconnected, lifted out, and the truck driven to the unloading station on the yard or on the field and emptied by means of the independently driven scraping floor through a discharge aperture preferably at the tail of the vehicle.

Naturally the number of beheading units or respectively of the rows to be worked in one run may be increased or decreased as desired.

In FIGS. 3 and 4 a swivel frame 32 is mounted for pivotable movement in horizontal and vertical planes and is connected to the pivot frame 9. Frame 32 carries digging tools 31 secured on a working bar 45, which are held vertically displaceable in a socket 34 and with a clearance angle which is variable by setting screws 27 (FIG. 2) and which are guided by guide skids 30 preferably automatically along the beet row. Rod or grid shaped deflectors 36 are mounted at the ends of the sockets 34 to deflect the dug beets so that they remain lying in a common row. A machine according to this example of construction can, in one operation, cut and collect the leaves and dig the beets out of the ground and deposit them between the wheel track of the self-loading truck.

The beets which are simultaneously lifted and conveyed out of the ground may also be additionally subjected to cleaning by cleaning drums or cleaning chains (not shown) and/or be deposited by collecting bins in so-called cross swaths so that later mechanical pick-up is possible.

In the embodiment of FIGS. 5, 5a and 6 the construction includes beheading or leaf cutting devices 45 for two beet rows and digging devices 46 for two additional rows arranged side by side. The procedure in beheading, loading and digging may either correspond to that in FIGS. 3 and 4 or be further improved according to FIGS. 5 5a and 6 in that there is arranged between the digging tools 31 an elevator 46 which grips the dug beets with its engaging means such as supporting plates 48 arranged at spaced locations along an elevator chain 47. The plates 48 convey the beets up a shaft 57 formed by grates 49 and 50 to above the loading surface and deposits them on the surface in a pile. The engaging means 48 are then moved by the elevator chain 47 to a zone in which they are deflected inwardly and then outwardly by a lower deflecting wheel 52 to engage each beet in succession.

According to the invention, the engaging means 48 are movably connected with the chain 47 and controlled by cams 51 which are guided on a grate 49. The engaging means 48 are flipped over at the descending section and grip the beets along the path shown in dash-dot lines at the lower deflecting wheel 52, and throw them off at the upper deflecting wheel 53. The cams 51 of the ascending section slide, according to the invention, over bosses 54 arranged at spaced locations along the grate 49 on the guide for the cams 51. The bosses impart a shaking movement to the engaging means 48, whereby the beets are cleaned during transportation. The earth can fall to the ground through the inclined grate 50.

According to the invention, with a machine according to this arrangement, beet leaf and beets can be harvested and loaded simultaneously, if the loading surface is divided lengthwise into two halves by a partition 55 (FIG. 6). Preferably also a scraping floor 3 is in this case divided into two single units 3a and 3b, which can be driven separately and at different speeds. The units 3a and 3b comprise movable scraper conveyors which move the materials backwardly so that even filling of the truck on the one side with leaves and on the other side with beets is rendered possible by controlling speed of the conveyors to any existing gravimetric or volumetric ratio between leaves and beets.

Also without the division of the loading surface or respectively of the scraping floor into two halves a very advantageous use of the machine is further possible in the manner that the beheading devices 44 and the digging devices 45 are used alternately. First, for example, two rows of beets are beheaded by the beheading devices 44 and are loaded by the conveyor onto the entire loading surface. The digging devices may at the same time remain lifted up, or in a travel position. After the unloading of the leaves, the same rows are gone over in the opposite direction and the digging devices brought into working position with the beheading device lifted up or removed. The loading material can be distributed over the full width of the rolling floor by means of guiding elements despite a somewhat lateral feed.

Naturally the elevator 46 can, if desired, be used purely for the loading of a longitudinal swath of beets previously deposited according to FIG. 4.

The installation of the elevator 46 according to FIGS. 5 and 6 may make it necessary that parts of the conveyor, e.g., the grid 7, the pivoting board 8, the tines 42 are dividable or removable at the self-loading truck so that in one part they remain usable in the zone of the beheading device 44, but in the other part can easily be disassembled in the zone of the digging device 45 before its installation.

According to the invention, the loading surface is designed as shaking or screening grate, so that during the filling of the loading surface an additional cleaning of the beets from adhering dirt or earth is brought about.

As the leaves are somewhat lighter in weight than the beets in the construction according to FIG. 7, a collecting box 56 for beet leaf having its own floor (possibly a scraping floor) is arranged on the side walls of the loading space. Thus the beets can be loaded on the actual loading surface 4, while the leaves are loaded in a second box 56 closing off the loading space at a second floor level. With this arrangement another very simple full harvesting machine for leaves and for beets is provided by the invention, which—in contrast to all hitherto known machines or methods—makes it possible to bring in the entire harvested material in the full width of the truck by a single passage over the field and without any manual work and by one machine and one operator.

Since with the construction of FIG. 7 first the same row is beheaded and then immediately dug, the conveyance of the harvested material occurs in two successive conveyor shafts 6 and 57 arranged on different levels. Naturally the machine according to this example of construction makes higher demands on the traction of the tractor and the carrying capacity of the self-loading truck. It will therefore be preferably equipped with a driving axle known in itself or designed as a self-driving model.

FIG. 8 shows a complete powered machine and loader. This example of construction offers a further advance inasmuch as the operating and driving properties are better (four-wheel drive). A further decisive advantage resides in that the self-driving form according to FIG. 8 is capable of harvesting the leaves and immediately thereafter the beets before any wheel of the vehicle has traversed the field. In this way for the first time all damage due to soil pressure, tracks, dirtying of the harvested material and loss of harvest are completely avoided.

According to the invention as shown in FIG. 8, the self-driving harvesting machine generally designated 120 includes parts similar to the other embodiment and designated with a prime. A frame 1', the conveyor 5', scraping floor 3', loading space 4', and preferably four wheels 58', if desired with twin tires, which are preferably all driven and of which at least two are steerable. A motor 59', transmission 60', driver's seat 61', and controls 62' are at the front of the vehicle and above the beheading and pick-up device 44' and 45'. Parts of the transmission 60a' may readily be arranged behind the conveyor channel 6' or respectively within the front axle 63', since according to the invention the cardan shaft 64' can be passed from the motor in a tunnel 65', which receives also for example the steering linkage 66' or control parts 67' for the brake, etc., through the conveyor channels 6 and 57 to the two axles. The conveyor channels 6', 57' for the leaves and the beets extend on both sides of the tunnel 65 approximately over the entire width of the vehicle, so that a very high hourly output is possible with this vehicle.

The drive of the conveying and beheading device as well as of the elevator 46 is from the transmission 60a, as is also the drive of the lift-out device, however, the latter might advantageously be operated by means of hydraulic lift cylinders.

The drive of the rolling and scraping floor is effected by a crank drive 68 through a pull rod 69. The drive of the scraping floor 3c of the upper loading box 59 may take place disconnectably from a shaft of the lower scraping floor 3.

According to the invention, the conveyor 5 is designed in two parts in such manner that both parts can receive their drive from the driven shaft of a worm gear 73 which is arranged in the tunnel 65 whose worm shaft 74 is part of the transmission shaft 64 mounted in the tunnel 65.

As can be seen from the drawing, the driver's seat next to the motor 59 in front offers good vision forward and also downward onto the implements; getting on and off is convenient, and the driver can be protected from sun and rain simply by a roof 70 to be provided at the loading space, without hindrance to the driver.

The drive of the rear axle occurs in known manner through a cardan joint shaft 71. As the total weight of the vehicle rests above and in part even before the driven axles, this vehicle attains an astonishing cross-country mobility especially climbing capacity.

The machine proposed by the invention in its several variations shown can be used under all conditions occurring in agriculture in efficient and productive manner so that considerable reduction of cost, acceleration, and perfection of the harvesting work is achieved.

While specific embodiments of the invention have been shown and described in detail to illustrate the application of the inventive principles, it will be understood that the invention may be embodied otherwise without departing from such principles.

What is claimed is:

1. A self-loading harvesting device particularly for root crops arranged in parallel rows in the ground, wherein said crops have root portions and head portions, wherein said device consists of a self-loading truck having an undercarriage and capable of movement along the path of the crop rows and having a loading chamber comprising a first and second compartment, including the combination of, a plurality of means for severing the head portions from the root portions of the crops at substantially ground level, first conveyor means to transport the severed head portions to the first compartment of said loading chamber, said first conveyor means including drive means, a guide chute disposed below the undercarriage of the self-loading truck connecting each of said severing means with said first compartment, a plurality of means for uprooting the root portions after the head portions have been severed, second conveyor means to transport the uprooted portions into a second compartment of said loading compartment, mounting means to position said severing means and said uprooting means below the undercarriage of said truck and below the front end of said loading chamber, said mounting means including second adjustable mounting means to cause said uprooting means to operate sequentially after said severing means, third conveyor means within said first compartment for receiving severed head portions and for transporting the severed head portions to the rear of said first loading compartment, fourth conveyor means in said second compartment for transporting the uprooted portions at the rear of said second loading compartment, said mounting means for said severing means including a U-shaped pivotal frame member with two arms, the extremity of each frame arm pivotally mounted on opposite sides of said truck, a rotatable shaft extending transverse of the truck between the interior ends of said frame arms, first height control means to raise and lower said pivotable frame member relative to the undercarriage of said truck to control the distance between said severing means and said uprooting means and the ground, said second height control means including a first chain extending between said rotatable shaft and the undercarriage of said truck, means for imparting rotary motion to said shaft, at least two rocker arms, bearing blocks affixed to one end of each of said rocker arms and mounted intermediate the ends of said rotatable shaft by pins, an axle extended between the free ends of said rocker arms, said severing means including a tracing disk mounted for rotation on said axle and resting upon the ground to ride across the leaf portion of said crop extending above the ground, means to impart rotary motion to said tracing disk, a beheading knife suspended between said rocker arms, knife adjustment means to vary the distance between said knife and the crown of the root crop, said tracing disk holding the crop steady at the time said knife severs the crown portion, said mounting means for uprooting means including a swivel frame supporting the one end from said rotatable shaft, second height control means for adjusting the height of said swivel frame with regard to the ground, a digging tool, digging tool mounting means mounting said digging tool vertically and pivotally adjustable with respect to said swivel frame, said digging tool adjustable mounting means including a vertical socket mounted at the free end of said swivel frame, a working bar whose upward extremity extends into said socket, a set screw to adjust said bar vertically with respect to said socket, said digging tool affixed to the lower extremity of said bar, a guide skid extending horizontal and preceding said digging tool to guide said knife to engage the root portion, grid shaped deflectors extending horizontally and rearwardly of said digging tool to deflect said uprooted portions into a common row, said second conveyor means to transport the uprooted portions into said second compartment of said truck disposed behind said digging tool.

2. A self-loading harvesting device as defined in claim 1, wherein said second height control means includes a second chain one end of which is attached to the free end of said swivel frame and the other end adjustably mounted to the undercarriage of said truck, means to raise and lower said chain to vary the distance between said digging tool and the ground and abutment means to prevent the swivel frame from coming into contact with the undercarriage of the truck during lifting.

3. A self-loading harvesting device as defined in claim 2, wherein said second conveyor means includes an endless chain with projecting paddle members carried thereby, a root portion chute extending from a location adjacent ground level but rearward of said digging tool upwardly into said loading chamber, drive means for said chain and means for agitating said paddle members during their passage from ground level upwardly to the storage chamber to impart a shaking motion to said paddle members to preliminarily clean said uprooted portions.

4. A self-loading harvesting device as defined in claim 3, wherein said first further height control means includes a wheel, a support bar extending horizontally and in advance of said pivotable frame member, means for mounting said wheel to said bar and means for adjusting the vertical distance between said wheel and said support bar to vary the distance of said pivotable frame relative to the ground.

5. A self-loading harvesting device as defined in claim 4, wherein the pivot axis of said pivotable frame is concentric with the axis of rotation of said first conveyor.

6. A self-loading harvesting device as defined in claim 5, wherein said second conveyor drive means includes a driving chain connection between said first conveyor drive means and said rotating shaft and a driving connection between said rotating shaft and said second conveyor drive chain.

References Cited

UNITED STATES PATENTS

| | | |
|---|---|---|
| 1,166,897 | 1/1916 | Geiger. |
| 1,346,433 | 7/1920 | Varland. |
| 1,491,517 | 4/1924 | Christensen _____ 56—121.4 |
| 2,478,877 | 8/1949 | Smith _____ 56—121.45 |
| 2,486,915 | 11/1949 | Botimer _____ 56—121.45 |
| 2,660,853 | 12/1953 | Altgelt _____ 56—121.45 |
| 3,173,564 | 3/1965 | Mayo. |
| 3,306,017 | 2/1967 | Wells _____ 56—121.45 |

FOREIGN PATENTS

| | | |
|---|---|---|
| 534,051 | 12/1954 | Belgium. |
| 560,650 | 4/1957 | Italy. |
| 1,187,955 | 9/1959 | France. |

ANTONIO F. GUIDA, *Primary Examiner.*

U.S. Cl. X.R.

171—55, 104; 56—345, 364; 214—83.36